(12) United States Patent
Zeng et al.

(10) Patent No.: US 10,591,711 B2
(45) Date of Patent: Mar. 17, 2020

(54) MICROSCOPE AND METHOD FOR OBTAINING A HIGH DYNAMIC RANGE SYNTHESIZED IMAGE OF AN OBJECT

(71) Applicants: LEICA MICROSYSTEMS (SCHWEIZ) AG, Heerbrugg (CH); LEICA INSTRUMENTS (SINGAPORE) PTE LTD, Singapore (SG)

(72) Inventors: Zheng-Dong Zeng, Singapore (SG); Qing-Song Zou, Singapore (SG); Urs Schmid, Feuerthalen (CH)

(73) Assignees: Leica Microsystems (Schweiz) AG, Heerbrugg (CH); Leica Instruments (Singapore) Pte Ltd, Singapore (SG)

(*) Notice: Subject to any disclaimer, the term of this patent is extended or adjusted under 35 U.S.C. 154(b) by 267 days.

(21) Appl. No.: 15/516,149

(22) PCT Filed: Oct. 6, 2014

(86) PCT No.: PCT/EP2014/071353
§ 371 (c)(1),
(2) Date: Mar. 31, 2017

(87) PCT Pub. No.: WO2016/055090
PCT Pub. Date: Apr. 14, 2016

(65) Prior Publication Data
US 2017/0307869 A1    Oct. 26, 2017

(51) Int. Cl.
*G02B 21/36* (2006.01)
*G02B 21/06* (2006.01)
*H04N 5/235* (2006.01)

(52) U.S. Cl.
CPC .......... *G02B 21/367* (2013.01); *G02B 21/06* (2013.01); *G02B 21/365* (2013.01); *H04N 5/2355* (2013.01)

(58) Field of Classification Search
None
See application file for complete search history.

(56) References Cited

U.S. PATENT DOCUMENTS

| 6,677,992 B1 * | 1/2004 | Matsumoto | H04N 5/2258 348/229.1 |
| 6,753,876 B2 | 6/2004 | Brooksby et al. | |

(Continued)

FOREIGN PATENT DOCUMENTS

| JP | 2007121375 A | 5/2007 |
| JP | 2013013111 A | 1/2013 |

(Continued)

OTHER PUBLICATIONS

Zhong, et al., Design of a Novel Micro-detection System Based on Image Dynamic Range Enhancement, Proc. of SPIE, vol. 7513, p. 751326, 7 pages 2009.

(Continued)

*Primary Examiner* — Christopher G Findley
(74) *Attorney, Agent, or Firm* — Hodgson Russ LLP

(57) ABSTRACT

A microscope (10) for obtaining a high dynamic range synthesized image (21) of an object (12) from a plurality of low dynamic range input images (19) comprises a controller (14), an incoherent light source (16) for illuminating the object (12) at different light intensity levels, and a recording device (18) for recording the plurality of low dynamic range input images (19), wherein each of the low dynamic range input images (19) is recorded at a different light intensity level. The controller (14) is configured to control the recording device (18) such that during recording of the series of the low dynamic range images the recording parameters for obtaining the plurality of low dynamic range input images (19) are kept constant.

22 Claims, 6 Drawing Sheets

(56) References Cited

U.S. PATENT DOCUMENTS

| | | |
|---|---|---|
| 7,460,168 B2 | 12/2008 | Horiuchi |
| 2003/0117412 A1 | 6/2003 | Brooksby et al. |
| 2004/0117412 A1 | 6/2004 | Tran et al. |
| 2008/0297597 A1 | 12/2008 | Inomata et al. |
| 2010/0183071 A1 | 7/2010 | Segall et al. |
| 2012/0257077 A1* | 10/2012 | Suzuki ................ H04N 5/2355 348/222.1 |
| 2013/0287296 A1* | 10/2013 | Li ........................ H04N 5/2355 382/167 |
| 2013/0307951 A1 | 11/2013 | Ono |

FOREIGN PATENT DOCUMENTS

| | | |
|---|---|---|
| JP | 2013255655 A | 12/2013 |
| WO | 02085000 | 10/2002 |
| WO | 2013069644 A1 | 5/2013 |

OTHER PUBLICATIONS

Zhong, et al., Application of Microscopic Image Dynamic Range Enhancement in Sputum Smear Tuberculosis Intelligent Examination, Proc. of SPIE, vol. 7382, p. 73824F, 7 pages 2009.

\* cited by examiner

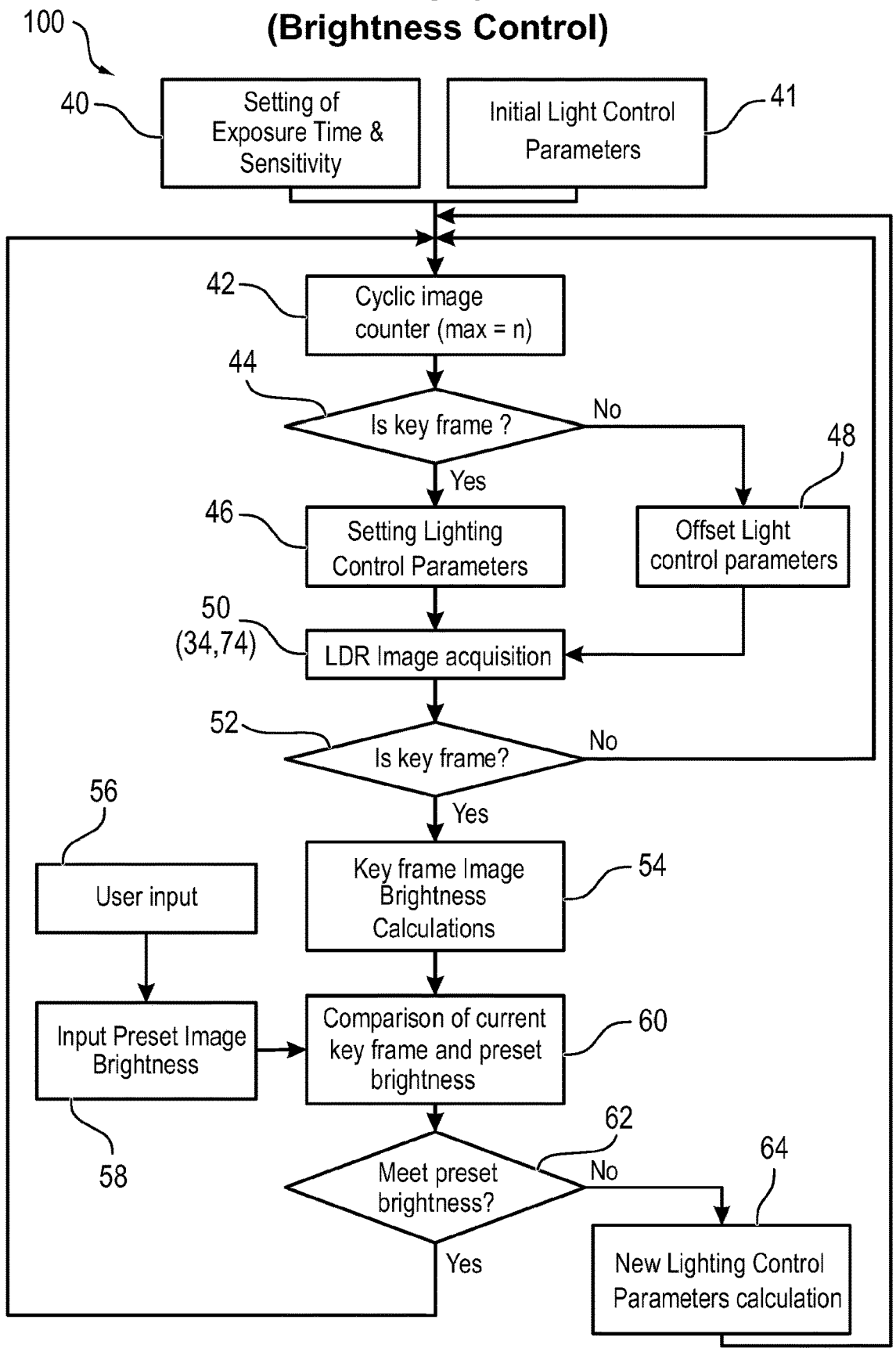

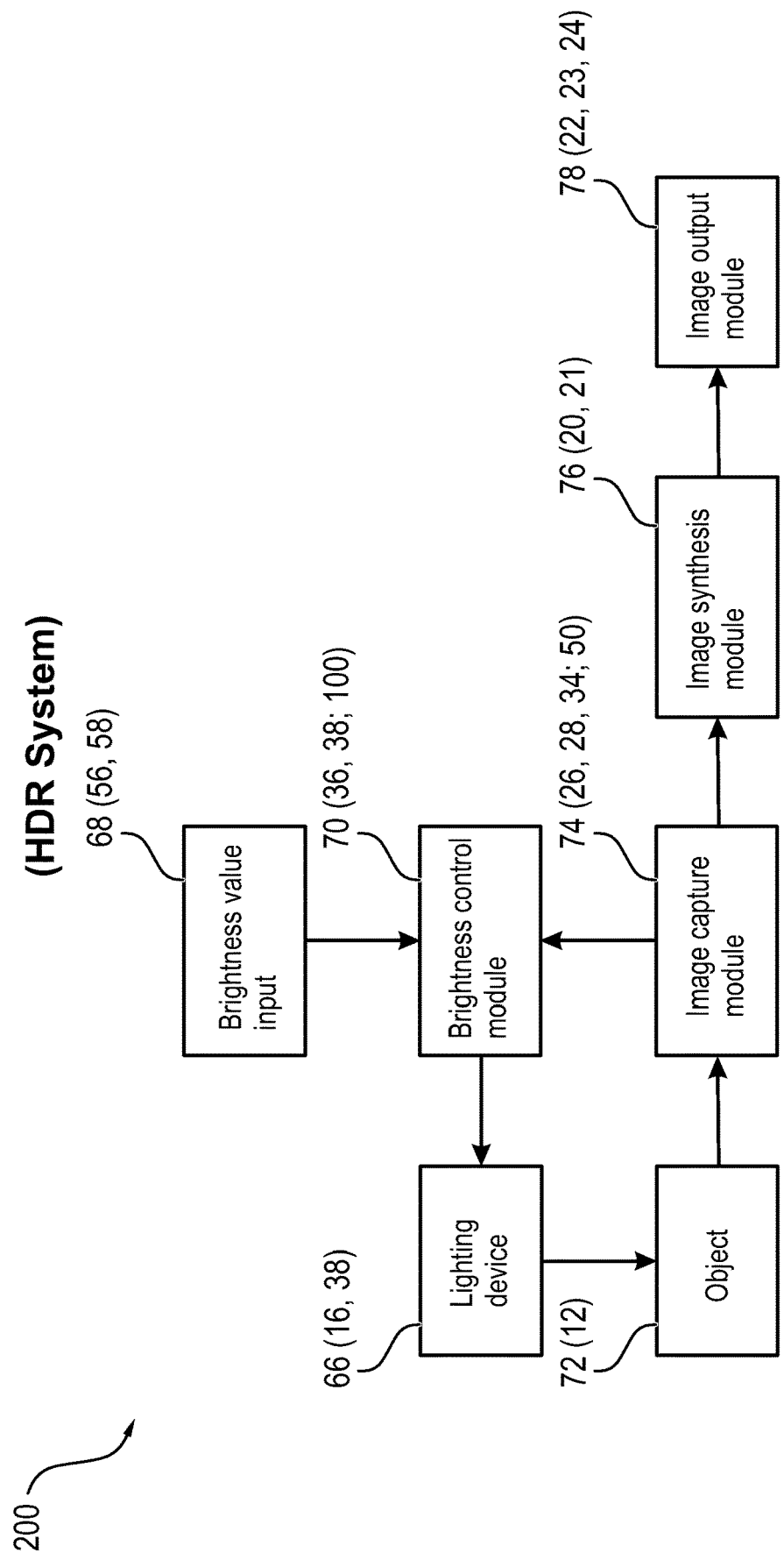

MICROSCOPE AND METHOD FOR OBTAINING A HIGH DYNAMIC RANGE SYNTHESIZED IMAGE OF AN OBJECT

CROSS-REFERENCE TO RELATED APPLICATIONS

The present application is the U.S. national phase of International Application No. PCT/EP2014/071353 filed Oct. 6, 2014, the entire contents of which are incorporated herein by reference.

FIELD OF THE INVENTION

The invention relates to a microscope for obtaining a high dynamic range synthesized image of an object from a plurality of low dynamic range digital input images. Further, the invention relates to a method for obtaining a high dynamic range synthesized image of an object from a plurality of low dynamic range digital input images.

BACKGROUND OF THE INVENTION

Nowadays, many consumer and mobile phone cameras offer some sort of high dynamic range (HDR) mode to deal with a high contrast in the subject. HDR, as its name implies, is a method that aims to add more dynamic range to digital images, where dynamic range is the ratio of bright to dark in an image. To achieve HDR with limited hardware capability, instead of just taking one picture, HDR uses several images, usually taken at different exposure times, or at different apertures, or different sensitivities (i.e. gains) and combines them into a single image.

However, the known methods of varying the exposure time introduce some limitations for controlling the image brightness. In particular, increasing the exposure time to obtain an HDR image can cause a drop in the frame rate. Further, if the known method of controlling the aperture is used, the image resolution will drop accordingly when the aperture size is reduced. Furthermore if the known method of increasing the sensitivity is used, chip noise can occur which results in brightness fluctuations on dark images.

From Document U.S. Pat. No. 6,753,876 B2, a method to increase the image dynamic range by using a laser for illumination and fusing multiple illumination levels of each pixel is known. It provides a floating-point illumination to achieve a high dynamic range image. This known method, however, has certain limitations. In particular, using a laser for the illumination measurement makes illumination systems much more complicated. Further, such systems are difficult to use for color imaging systems. Further, such systems are more sensitive to the surface finishing and surface facet angle which will limit the application dramatically. Further, the illumination of this known method uses a stripe pattern which will increase the difficulty of pixel fusion.

From Document U.S. Pat. No. 7,460,168 B2, an image processing apparatus for generating a wide dynamic range image is known. According to this known concept, a wide dynamic range image is generated in that a plurality of images is recorded under different exposure conditions. First, properly exposed areas and insufficiently exposed areas are divided (segmenting). In addition, a gradation of each image is performed. Then, a correction is performed to obtain corrected images. Finally, a single wide dynamic range picture is composed.

From Document US 2012/0257077 A1, an HDR image forming apparatus is known which also uses a similar technique in that the exposure time is controlled.

The above-mentioned prior art methods are typical examples of using exposure time control methods to obtain different intensity images and to fuse them into one wide dynamic range image. Indeed, the known methods of controlling the exposure time are technically simple and easy to use. However, the prior art techniques will introduce the above-mentioned limitations for controlling the image brightness. In particular, increasing the exposure time to obtain HDR images can cause a change or drop in the frame rate.

SUMMARY OF THE INVENTION

Therefore, it is an object of the invention to specify a microscope for obtaining a high dynamic range synthesized image of an object from a plurality of low dynamic range input images, which has a simple structure and allows avoiding high requirements on the image generation.

This object is solved by a microscope having the features described herein and by a method having the features described herein. Advantageous developments of the invention are described in the present specification.

According to an embodiment of the invention, the simple structure and the possibility of avoiding high requirements on the image generation can be achieved since the object is illuminated at different light intensity levels using an incoherent light source of a microscope, and the plurality of low dynamic range (LDR) input images is recorded using a recording device comprising an optical imaging system having an optical aperture and an image sensor of the microscope. Further, control signals are provided to control the recording device and the incoherent light source of the microscope such that a plurality of low dynamic range input images at different light intensity levels is captured while at least one of a plurality of recording parameters is kept constant. Therefore, it is not required to change the recording characteristic of the recording device during the image generation. This allows the simple structure of the microscope, and in particular, high requirements on the image generation can be avoided.

In other words, it can be sufficient to only vary the control signal for the incoherent light source while keeping the recording parameters of the image acquisition constant.

Preferably, the controller is configured to control the recording device while a frame rate during capturing the plurality of low dynamic range input images is kept constant. Therefore, a change or drop in the frame rate can be avoided during the image generation.

It is advantageous when the recording parameters are one or a group of an exposure time and an aperture of the optical imaging system and a sensitivity (i.e. gain) of the image sensor for obtaining the plurality of low dynamic range input images, and if one or a group of these are kept constant. Therefore, there is no effort for adjusting the exposure time and/or the aperture during the image generation.

Further, it is advantageous when the controller is configured to control the recording device such that a desired brightness level of a key frame of the plurality of low dynamic range input images is obtained. Preferably, the controller is configured to obtain the desired brightness level of the key frame by performing a comparison of an actual brightness level of the key frame with a predefined brightness level input by a user. Therefore, it is possible to easily achieve a desired brightness level of a key frame of a recorded set of images.

Further, it is advantageous when the controller is configured to determine a key frame from the plurality of low dynamic range input images, wherein an index m of the key frame is determined based on the number n of the low dynamic range input images. Preferably, the controller is configured to determine the key frame by using $$m = \frac{n+1}{2}$$

if n is an odd number, or $$m = \frac{n}{2}$$

if n is an even number, wherein m is the index of the key frame, and n is the number of the plurality of the low dynamic range input images. Therefore, it is possible to easily determine the key frame of a recorded set of images.

Further, it is advantageous when the microscope is configured such that the plurality of low dynamic range input images have different brightness levels corresponding to the different light intensity levels. Therefore, a suitable set of images for the generation of the high dynamic range (HDR) synthesized image of the object can be obtained.

Further, it is advantageous when the microscope is configured such that the different light intensity levels of the illumination of the object are characterized by a light intensity offset, wherein the light intensity offset is given by $$I_i = I_m * R_{HDR}^{[(i-m)/(n-1)]}$$

wherein $I_i$ is the light intensity level for a recording of an individual low dynamic range input image, $I_m$ is the light intensity level for a recording of a key frame, i is an index of the individual low dynamic range input image, m is an index of the key frame, $R_{HDR}$ is a predefined dynamic range coefficient, and n is the number of the low dynamic range input images. Therefore, it is possible to appropriately adjust a light intensity offset for a recorded set of low dynamic range input images to be used for the generation of the high dynamic range synthesized image of the object.

Further, it is advantageous when the microscope further comprises a combiner for combining the plurality of low dynamic range input images recorded at the different light intensity levels to obtain the high dynamic range synthesized image. Preferably, the combiner is configured to add the intensity information of each of the low dynamic range input images to obtain the high dynamic range synthesized image. Therefore, there exists a first possibility of generating the high dynamic range synthesized image in an efficient way.

Alternatively, the combiner is configured to add the intensity information of a first pair of consecutive low dynamic range input images to obtain a first high dynamic range synthesized image and to add the intensity information of a second pair of consecutive low dynamic range input images to obtain a second high dynamic range synthesized image, wherein the first pair of consecutive low dynamic range input images and the second pair of consecutive low dynamic range input images comprise a common low dynamic range input image of the plurality of low dynamic range input images. Therefore, there exists a second possibility of generating the high dynamic range synthesized image in an efficient way.

Further, it is advantageous when the microscope further comprises a tone mapper for applying a tone mapping algorithm to the high dynamic range synthesized image to obtain tone mapped image data, the tone mapped image data representing a reduced dynamic range compared to the dynamic range of the high dynamic range synthesized image. Therefore, it is possible to generate tone mapped image data representing a reduced dynamic range to be displayed by a monitor which still sustains details in very dark and very bright areas of the image.

Preferably, the microscope further comprises a live streaming image output module configured to generate a live image on the basis of the high dynamic range synthesized image.

Preferably, each of the plurality of low dynamic range input images is a digital image.

According to an embodiment of the invention, a method for obtaining a high dynamic range synthesized image of an object from a plurality of low dynamic range input images is provided. The method comprises illuminating the object at different light intensity levels using an incoherent light source of a microscope, recording the plurality of low dynamic range input images using a recording device comprising an optical imaging system having an optical aperture and an image sensor of the microscope, and providing control signals to control the recording device and the incoherent light source of the microscope such that a plurality of low dynamic range input images at different light intensity levels is captured while at least one of a plurality of recording parameters is kept constant.

In this context, it is explicitly pointed out that the synthesis of the HDR image is based on a calculation operation. This is actually not the same as performing the synthesis based on a pure extraction operation, where the intensity information is not used for a further calculation.

It is also explicitly pointed out here that the intensity values of all pixels of the full area of the image sensor or pixels of corresponding ROI (region of interest) areas of the image sensor having the same size and the same location in the different input images are used for the calculation operation of the HDR synthesis.

BRIEF DESCRIPTION OF THE DRAWING VIEWS

Further features and advantages of the invention result from the following description which explains the invention in more detail on the basis of embodiments in connection with the enclosed Figures.

FIG. 5 shows a block diagram of an implementation for a brightness control; and

FIG. 6 shows a schematic illustration of an overview of a high dynamic range imaging system.

DETAILED DESCRIPTION OF THE INVENTION

Figure 1:
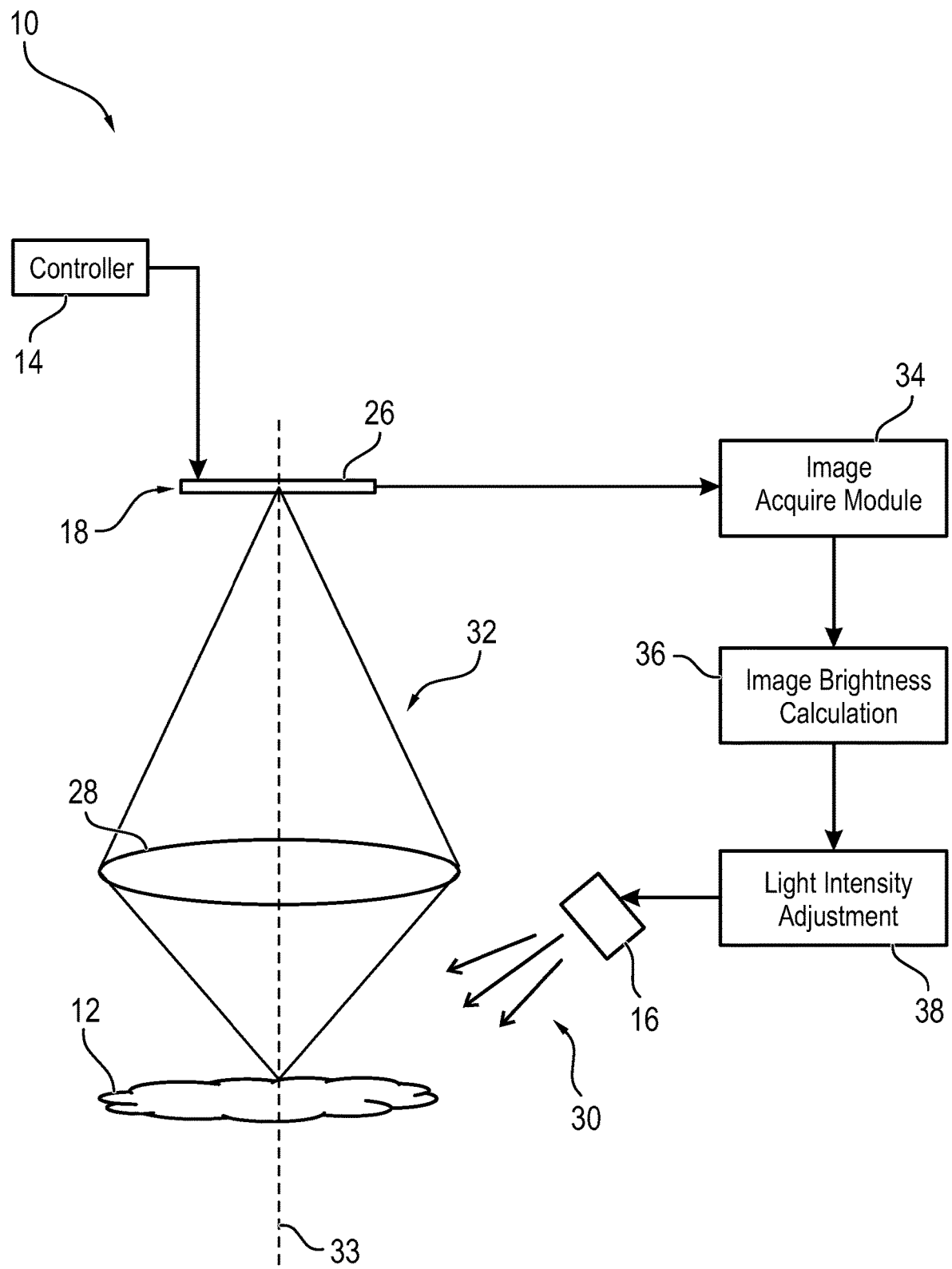
FIG. 1 shows a schematic illustration of a microscope comprising a controller, an incoherent light source and a recording device.

FIG. 1 shows a schematic illustration of a microscope 10 comprising a controller 14, an incoherent light source 16 and a recording device 18. As shown in FIG. 1, the recording device 18 comprises an image sensor 26 and an optical imaging system 28. The optical imaging system 28 is configured to image an object 12 onto the image sensor 26. The optical path is indicated by reference numeral 32. Further, the optical axis of the optical imaging system 28 is indicated by dashed line 33.

Referring to FIG. 1, the incoherent light source 16 is configured for illuminating the object 12 at different light intensity levels. The light emitted by the incoherent light source 16 is indicated by the arrows with reference numeral 30. The recording device 18 is configured for recording a plurality of low dynamic range input images of the object 12. In particular, each of the low dynamic range input images is recorded at a different light intensity level. Further referring to FIG. 1, the controller 14 is operatively coupled to the recording device 18 comprising the image sensor 26. The controller 14 is configured to control the recording device 18 such that a recording characteristic for obtaining the plurality of low dynamic range input images is kept constant. For example, the recording characteristic is a frame rate, an exposure time and/or an aperture.

The microscope 10 of FIG. 1 is configured for generating, based on the recorded low dynamic range input images, a high dynamic range synthesized image of the object 12. In particular, the dynamic range of the high dynamic range synthesized image is higher than the dynamic range of the recorded low dynamic range input images. The dynamic range is defined as the ratio of the highest intensity value to the lowest intensity value in the respective image. For example, the high dynamic range synthesized image has a dynamic range of 16 bit, while the recorded low dynamic range input images have a dynamic range of 8 bit. The plurality of low dynamic range input images has different brightness levels corresponding to the different light intensity levels. Further, the recorded low dynamic range input images represent different images of the same object 12.

As shown in FIG. 1, the microscope 10 further comprises components 34, 36, 38 of a control loop. In particular, the control loop comprises an image acquire module 34, an image brightness calculation module 36 and a light intensity adjustment module 38. The image acquire module 34 is configured for providing an image recorded by the image sensor 26. The image brightness calculation module 36 is configured for calculating a brightness information of the image provided by the image acquire module 34. The light intensity adjustment module 38 is configured for adjusting the light intensity level of the light generated by the incoherent light source 16 based on the brightness information calculated by the image brightness calculation module 36. Therefore, the control loop comprising the components 34, 36, 38 allows to control the incoherent light source 16 in dependence on the image recorded by the image sensor 26.

In other words, the present invention provides a brightness control system as shown in FIG. 1. This system comprises an image sensor 26 for converting an image of the object into electronic signals. The optical system 28 forms an object image on the sensor 26. Reference numeral 12 points to the object to be detected. The reflected light from the object is collected by the optical system. The lighting device 16 is used to illuminate the object 12. The image acquire module 34 is used to receive the image from the sensor and perform necessary image pre-processing. The image brightness calculation module 36 is used to analyze the image and calculate the brightness of the current image. The light intensity adjustment module 38 is used to control the lighting device 16 according to the target brightness obtained in the image brightness calculation module 36.

Figure 2:
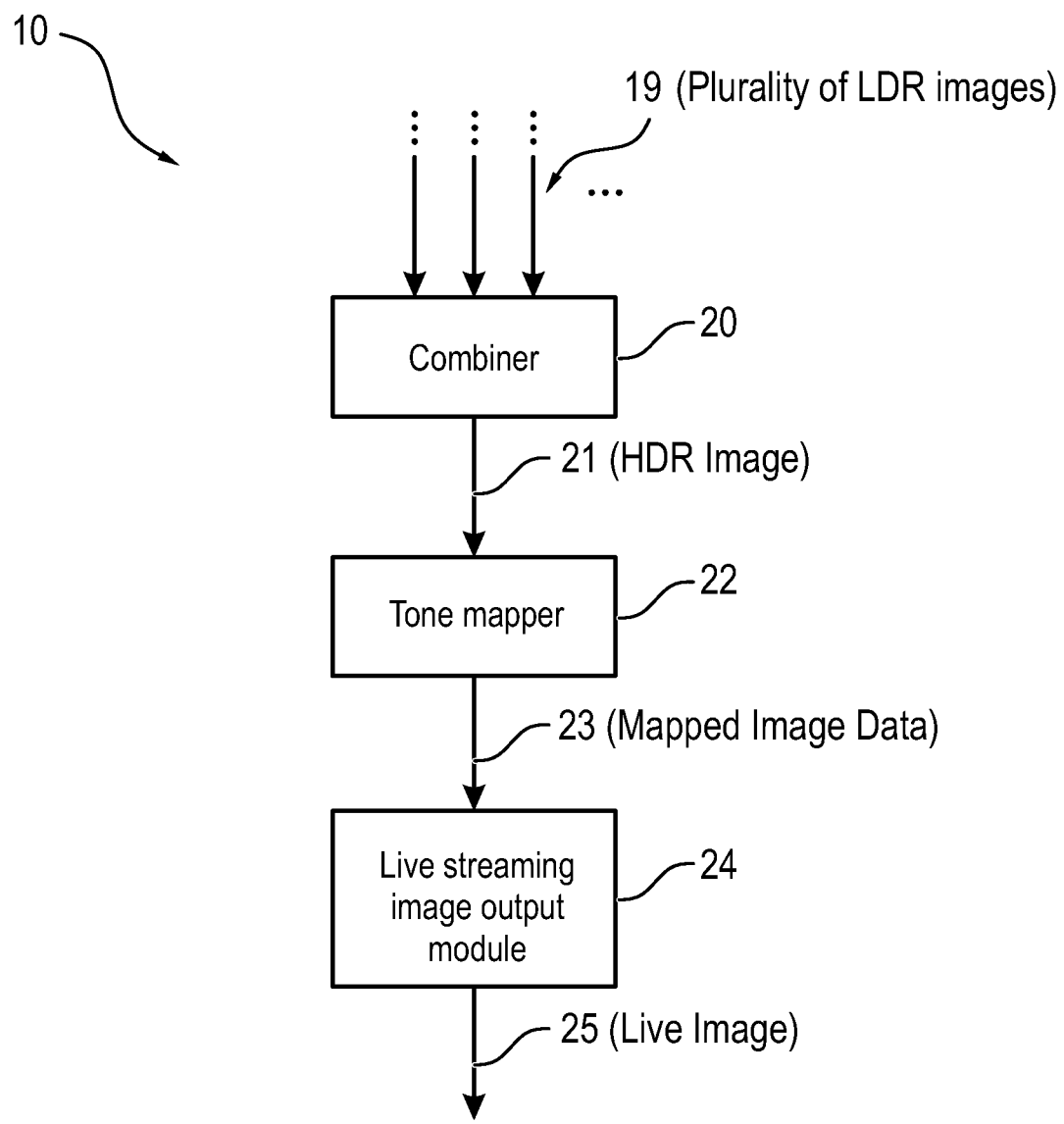
FIG. 2 shows a schematic illustration of the microscope according to FIG. 1 further comprising a combiner, a tone mapper and a live streaming image output module.

FIG. 2 shows a schematic illustration of the microscope 10 according to FIG. 1 further comprising a combiner 20, a tone mapper 22 and a live streaming image output module 24. In FIG. 2, the plurality of low dynamic range input images obtained with the microscope 10 according to FIG. 1 is denoted by reference numeral 19. The combiner 20 is configured for combining the plurality of low dynamic range (LDR) input images 19 recorded at the different light intensity levels to obtain the high dynamic range (HDR) synthesized image 21. The tone mapper 22 is configured for applying a tone mapping algorithm to the high dynamic range synthesized image 21 to obtain tone mapped image data 23. In particular, the tone mapped image data 23 represents a reduced dynamic range compared to the dynamic range of the high dynamic range synthesized image 21. The live streaming image output module 24 is configured to generate a live image 25 based on the tone mapped image data 23 provided by the tone mapper 22. The live image 25 output by the live streaming image output module 24 is displayed by a monitor. Therefore, the dynamic range of the high dynamic range synthesized image 21 is reduced such that the live image 25 can readily be displayed by the monitor and still display details in very dark and very bright areas of the image.

Figure 3:
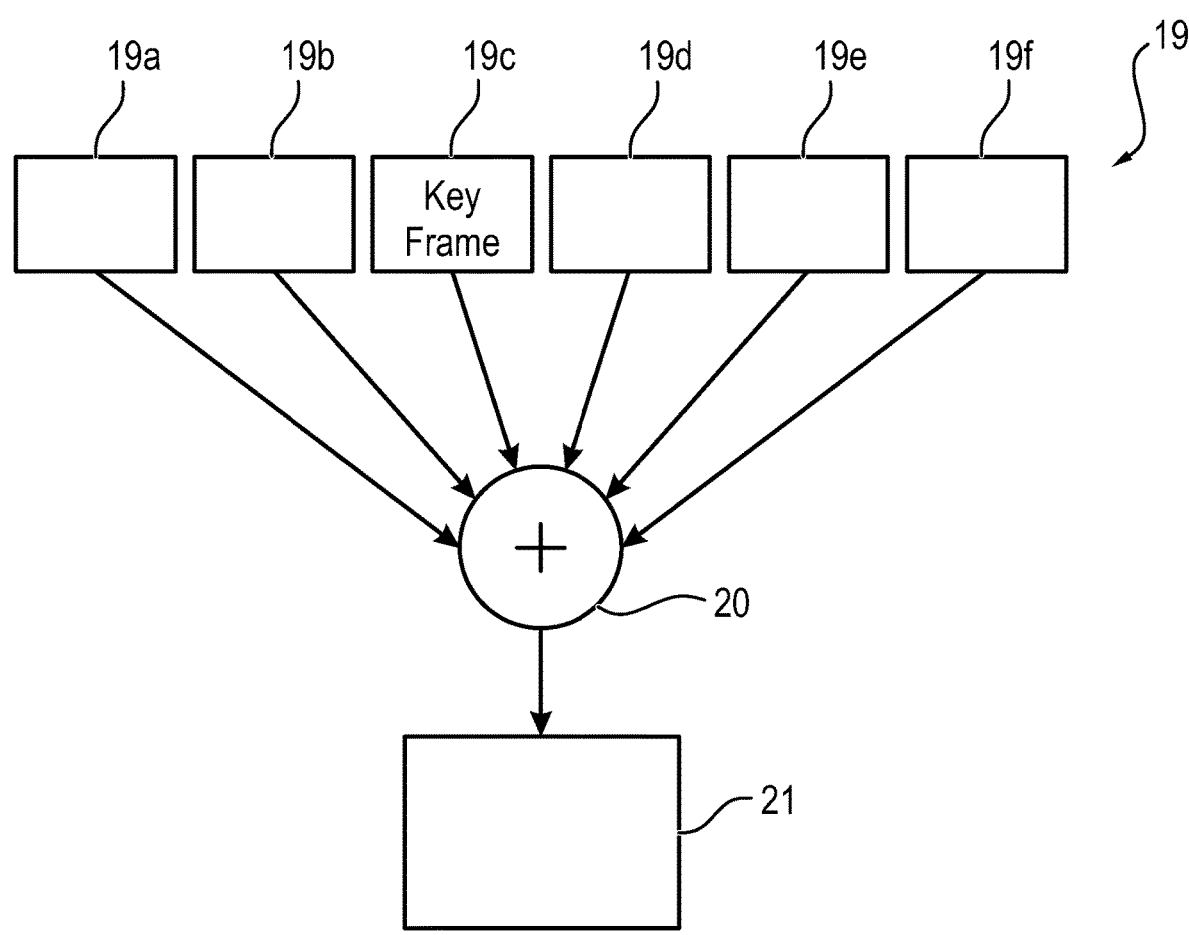
FIG. 3 shows the combiner of the microscope according to FIG. 1 for obtaining a high dynamic range synthesized image from recorded low dynamic range input images.

FIG. 3 shows the combiner 20 of the microscope 10 according to FIG. 1 for obtaining a high dynamic range synthesized image 21 from recorded low dynamic range input images 19. The recorded low dynamic range input images 19 correspond to the plurality of low dynamic range input images obtained with the recording device 18 of the microscope 10 shown in FIG. 1. In the example of FIG. 3, the recorded low dynamic range input images 19 comprise six low dynamic range input images 19a to 19f. These six low dynamic range input images 19a to 19f have different brightness levels corresponding to the different light intensity levels adjusted by the incoherent light source 16 of the microscope 10 shown in FIG. 1. In particular, the input images 19a to 19f shown in FIG. 3 have increasing brightness levels, wherein the first input image 19a has the lowest brightness level and the last input image 19f has the highest brightness level. Further, the brightness level is increased by a predefined amount between consecutive images of the set of input images 19a to 19f. The combiner 20 is configured to add the intensity information of each of the low dynamic range input images 19a to 19f to obtain the high dynamic range synthesized image 21. The intensity information corresponds to the intensity values of the pixels in the respective input image 19a to 19f. The synthesized image 21 output by the combiner 20 is characterized by the added intensity information and has a high dynamic range compared to the input images 19a to 19f. Therefore, the example of FIG. 3 represents a synthesis of an HDR image.

In other words, a series of images input or generated from an image synthesis module is shown in FIG. 3. A set of images 19a to 19f is captured with the object being illuminated under different light intensities of the lighting device.

The high dynamic range image 21 is then synthesized from the set of images 19a to 19f through a special image synthesis algorithm.

Figure 4:
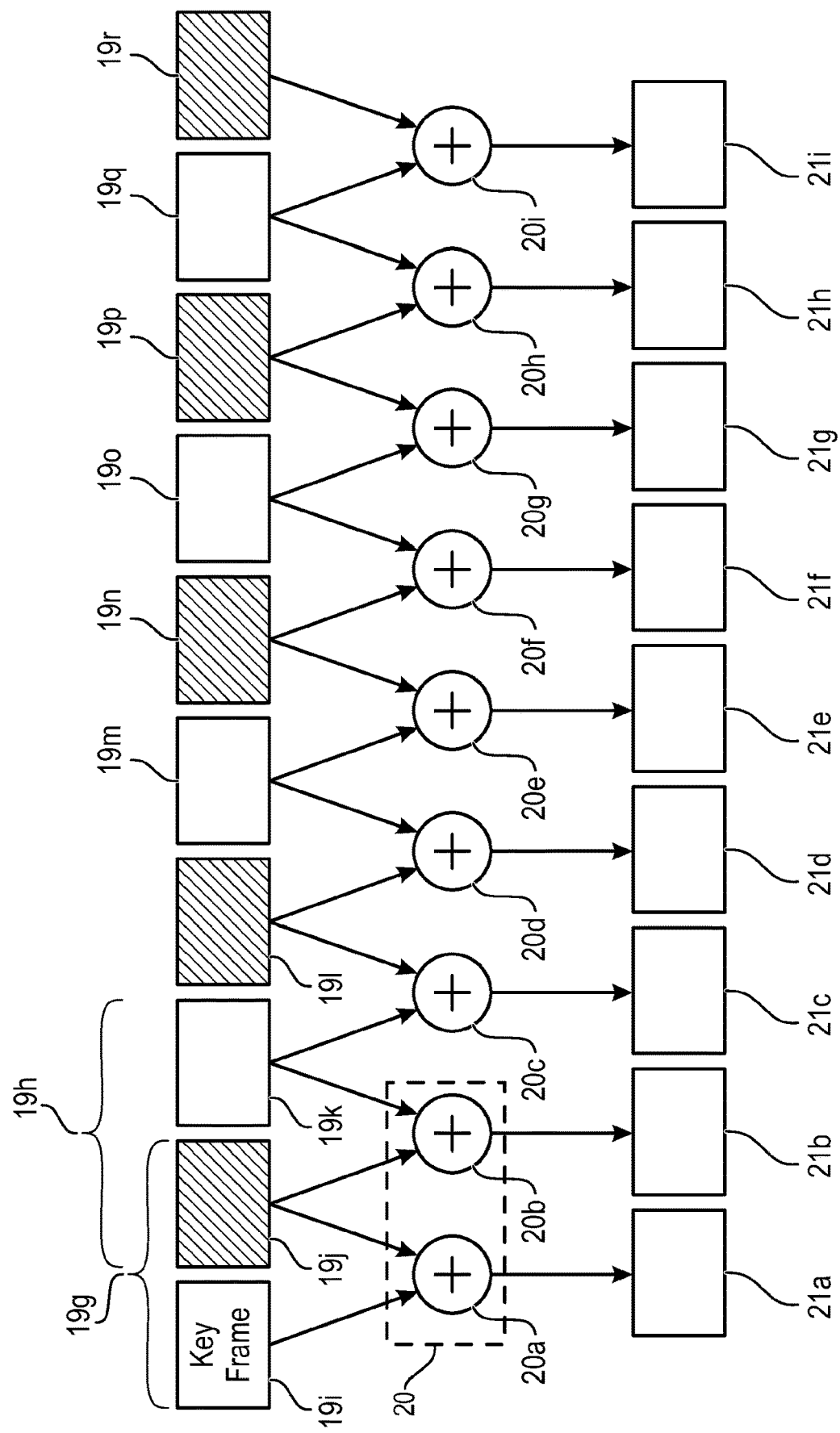
FIG. 4 shows the combiner of the microscope according to FIG. 1 for obtaining a first high dynamic range synthesized image and a second high dynamic range synthesized image from recorded low dynamic range input images.

FIG. 4 shows the combiner 20 of the microscope 10 according to FIG. 1 for obtaining a first high dynamic range synthesized image 21a and a second high dynamic range synthesized image 21b from recorded low dynamic range input images 19i, 19j; 19j, 19k; . . . ; 19q, 19r. The recorded low dynamic range input images 19i, 19j; 19j, 19k; . . . ; 19q, 19r correspond to the plurality of low dynamic range input images obtained with the recording device 18 of the microscope 10 shown in FIG. 1. In the example of FIG. 4, there are two consecutive low dynamic range input images 19i and 19j, 19j and 19k, . . . , 19q and 19r, respectively. In particular, the respective two consecutive input images 19i and 19j, 19j and 19k, . . . , 19q and 19r have different brightness levels corresponding to the different light intensity levels adjusted by the incoherent light source 16 of the microscope 10 shown in FIG. 1. In the example of FIG. 4, there are a first pair 19g of consecutive low dynamic range input images 19i and 19j and a second pair 19h of consecutive low dynamic range input images 19j and 19k. The first input image 19i of the first pair 19g has a comparatively high brightness level, while the second input image 19j of the first pair 19g has a comparatively low brightness level. Further, the first input image 19j of the second pair 19h has the comparatively low brightness level, while the second input image 19k of the second pair 19h has a comparatively high brightness level. In particular, the first pair 19g and the second pair 19h comprise a common low dynamic range input image 19j having the comparatively low brightness level.

As shown in FIG. 4, the combiner 20 comprises a first combining unit 20a and a second combining unit 20b. The first combining unit 20a is configured to add the intensity information of the first pair 19g of consecutive low dynamic range input images 19i and 19j to obtain the first high dynamic range synthesized image 21a, while the second combining unit 20b is configured to add the intensity information of the second pair 19h of consecutive low dynamic range input images 19j and 19k to obtain the second high dynamic range synthesized image 21b. This procedure can also be perpetuated accordingly for the complete set of input images 19i to 19r. In particular, the combining units 20a to 20i can be used to obtain the corresponding set of high dynamic range synthesized images 21a to 21i. Therefore, the example of FIG. 4 represents an alternating stream of bright and dark images to be used for the synthesis of a stream of HDR images.

In other words, a concept of generating a live image streaming synthesized from alternating bright plus dark and dark plus bright images is shown in FIG. 4. First, a bright image 19i is combined with a dark image 19j to generate the first HDR image 21a. Next, dark image 19j is combined with bright image 19k to generate the second HDR image 21b. The process is repeated as required. By repeating this synthesis process alternately, a series of HDR images is generated. Using this method, one can create a HDR live image stream as fast as the speed of a standard live image.

FIG. 5 shows an implementation 100 for a brightness control. The implementation 100 of FIG. 5 comprises the components 40 to 64. The components 40 to 64 represent method steps of the brightness control implementation 100. The brightness control implementation 100 is performed with the microscope 10 shown in FIG. 1.

In a step 40, a setting of the exposure time, the aperture and the sensitivity of the recording device, including the image sensor 26 and optical imaging system 28, is performed. In a step 41 a default value of the light control parameters is set which is used as the starting value for the subsequently described routine. In a step 42, a cyclic image counter is used for counting the input images from 1 to n whereby n is the maximum number of LDR images which are used for calculating a single resulting HDR image. The counter is reset when the maximum number n corresponding to the number of LDR input images is reached. In a step 44, it is checked whether the input image is a key frame. In a step 46, a setting of lighting control parameters for the incoherent light source is performed. In a step 50, an image acquisition is performed. In a step 52, it is checked whether the acquired image is a key frame. The steps 42 to 62 represent an endless loop for obtaining the input images. In particular, these steps represent an endless loop as long as an HDR-live image function is active. The steps starting from step 46 are only performed if the condition checked in step 44 is fulfilled. Otherwise, a step 48 is performed. In step 48, offset light control parameters are set. If the condition checked in step 52 is fulfilled, the following steps starting from a step 54 are performed. In step 54, a key frame image brightness calculation is performed. In a step 56, a user input is performed. In a step 58, an input of a preset image brightness is performed. In a step 60, a comparison of a current key frame and the preset brightness is performed. In a step 62, it is checked whether a condition of meeting the preset brightness is fulfilled. If this condition is not fulfilled, a calculation of new lighting control parameters is performed in a step 64.

The key frame is defined as an individual frame which should have the desired brightness level set by the user. The index m of the key frame is determined based on the number n of the recorded input images.

In the brightness control implementation 100 of FIG. 5, step 40 is performed to set a suitable exposure time and sensitivity of the imaging system so that the system can run with optimal performance such as high frame rate and low signal-to-noise ratio etc. Then, step 42 is performed to scan the image index from 1 to n cyclically. The index increases by one for every entry and returns to one once exceeding the maximum value n. If the current image is a key frame (m) as checked in step 44, it is proceeded to step 46 to set lighting control parameters according to a previous brightness calculation result of key frame (m, m<n). Otherwise, step 48 is performed to set lighting control parameters according to the offset brightness required for overexposure or underexposure image capturing. Step 50 is performed to acquire an image after the new light intensity is set. If the current image is not a key frame (m), the sequence is repeated from step 42. Otherwise, it is continued to step 54 for the key frame brightness calculation. Then, step 60 is performed to make a comparison between the current image brightness result and target values set by steps 56 and 58. If the brightness does not reach target brightness level, step 64 will be performed to calculate and update the new lighting device brightness control parameters and then repeat the sequence from step 42 and so on.

Referring to FIG. 5, an image brightness control method is used to ensure that the set of input images will be captured in an optimal light intensity. In the following, the control procedure is exemplarily described. First, a setting of a preset brightness value for a camera is performed. In particular, users may adjust image brightness to a preferred value (i.e. 100, 240, . . . ). Then, the average brightness of a full area or an ROI area of a key frame image is calculated. Then, the brightness of the key frame is compared with the preset value and the difference is obtained. Then, based on brightness differences, a new lighting control parameter for the key frame is calculated. Then, based on key frame lighting control parameters, a subsequent image frame corresponding to the lighting parameters can be obtained with a necessary underexposure or overexposure offset. Then, the lighting control parameter for the subsequent frame is applied to the lighting device 16 and the light intensity is adjusted accordingly. Then, subsequent frames of images are acquired under new lighting conditions. A repeat loop starting from the second step of the above control procedure and comprising all the steps of the same is established so that the image brightness is kept consistent, and a series of lighting environments is provided for the image captured, some of which include overexposure lighting, key frame lighting and underexposure lighting etc.

Further, a setting of the lighting control offset can be determined according to the object lighting condition. The following is an example process used to determine the lighting control offset. In particular, n input images are required for an HDR image synthesis where n≥2. However, the number of input images should not be so high as to increase the computation effort proportionally. The higher the value of n, the higher the light intensity provided for the illumination. The key frame is the frame that is chosen for the brightness calculation. This will reduce the computation effort for the brightness calculation, improve the consistency of the brightness and provide instant brightness control. As the key frame is used to adjust the lighting parameter, it is necessary to use a frame with less overexposure and yet with a good signal-to-noise ratio. For example, the key frame having the index m is chosen as follows:

$$m = \frac{n+1}{2} \text{ (if } n \text{ is an odd number)}$$
$$m = \frac{n}{2} \text{ (if } n \text{ is an even number)}$$

A dynamic range coefficient $R_{HDR}$ is a preset parameter. It is defined for the total range ratio of lighting which is used for the image acquisition. The lighting offset for each frame i is determined by:

$$I_i = I_m * R_{HDR}^{[(i-m)/(n-1)]}$$

where $I_i$ is the lighting intensity parameter for the image capturing of the i'th frame, and $I_m$ is the lighting intensity parameter for the key frame image capturing.

FIG. 6 shows a schematic illustration of an overview of a high dynamic range imaging system 200. In FIG. 6, an example of a fundamental construction of a digital imaging system for the inventive microscope 10 is shown. The high dynamic range imaging system 200 comprises components 66 to 78. Component 66 represents a lighting device for an object illumination. Component 72 represents an object under test. Component 68 represents a brightness value input for users to determine a comfortable image brightness. Component 70 represents a brightness control module for calculating the brightness of a current image and lighting device controls to ensure that image brightness meets the target value. This module is also used to control the offset of the brightness of the lighting device 66 for underexposure and overexposure image capture. In particular, component 70 is used for the brightness control process of FIG. 5. Component 74 represents an image capture module comprising an image forming optical system, an image sensor, a camera, and camera electronics systems. The key feature of the image capture module 74 is to deliver an image for post-processing and viewing. Component 76 represents an image synthesis module used for synthesizing a set of input images capture by the image capture module 74 into an image with a wider dynamic range. Component 78 represents an image output module used to display still or live images received from the image synthesis module 76. Specifically, component 76 is used for generating the high dynamic range synthesized image of the object.

In summary, the digital image system of the inventive microscope comprises a lighting device control module, an image capture module, an image fusion module and a live streaming image output module. The lighting device control module is able to auto-control the light intensity to ensure to reach target image brightness for different objects. The image capture module is capable of obtaining a set of input images with different light intensities by imaging the same object. The image fusion module generates a synthesized image from the set of input images of different light intensity. The live streaming image output module produces an HDR live image on the basis of the synthesized image generated by a set of captured images with different light intensity from the image capture module.

Specifically, the present invention provides a modulation of the illumination intensity for a fast HDR acquisition. Further, the present invention provides a method for increasing the dynamic range of an image or a live image by synthesizing multiple images captured at different levels of light intensity.

The present invention for generating an HDR image in microscopy is based on controlling the light intensity from the lighting device. According to the invention, the HDR sequence is faster than using a variation of exposure times, because the camera or the recording device does not need to set different exposure times. Therefore, customers can concentrate on bright and shiny objects and make sure that details can be seen in these areas. Details in dark areas can easily be added using the inventive HDR-LED method. In standard photography, the control of the light intensity is usually impossible, because one cannot change the sunshine or the overall brightness of a scene. The present invention provides the advantage that in microscopy, however, it becomes possible or it is at least much easier to control the LED light intensity to create a series of images which have details both in dark areas as well as in bright or shiny areas.

In the inventive microscope, the recording device may comprise an image sensor having a two-dimensional area of pixels for recording the low dynamic range input images. Further, the recording device may comprise an optical imaging system having a variable aperture. Further, the incoherent light source may be a light emitting diode (LED) for providing a uniform illumination of the object. Further, the object to be detected may be an electronic circuit.

By using the present invention, it is possible to obtain a series of images captured under specific lighting intensities, respectively. A local tone mapping algorithm can be applied to synthesize the set of images into one image with a widened dynamic range.

Further, the present invention provides a live HDR image which is generated based on an alternative synthesis method. The frame i for example, is generated from image i, i+1, . . . , i+n−1. This alternative synthesis method can be used to create a very fast HDR live image stream which almost reaches the speed of a standard live image.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

LIST OF REFERENCE SIGNS 10 microscope
12 object
14 controller
16 incoherent light source
18 recording device
19, 19a-19f, 19i-19r low dynamic range input images
19g, 19h pair of low dynamic range input images
20, 20a-20i combiner
21, 21a-21i high dynamic range synthesized image
22 tone mapper
23 tone mapped image data
24 live streaming image output module
25 high dynamic range live image
26 image sensor
28 optical imaging system
30 light
32 optical path
33 optical axis
34, 36, 38 control loop components
40-64 components of a brightness control implementation
66-78 components of a high dynamic range imaging system
100 brightness control implementation
200 high dynamic range imaging system

What is claimed is:

1. A microscope (10) for obtaining a high dynamic range synthesized image (21) of an object (12) from a plurality of low dynamic range input images (19), the microscope (10) comprising
an incoherent light source (16) for illuminating the object (12) at different light intensity levels,
a recording device (18) comprising an optical imaging system (28) having an optical aperture and an image sensor (26) for recording the plurality of low dynamic range input images (19), wherein each of the low dynamic range input images (19) is recorded at a different light intensity level, and
a controller (14) which is configured to provide control signals to control the recording device (18) and the incoherent light source (16) such that the plurality of low dynamic range input images (19) at different light intensity levels is captured while at least one of a plurality of recording parameters is kept constant;
wherein the microscope is configured such that the different light intensity levels of the illumination of the object (12) are characterized by a light intensity offset, wherein the light intensity offset is given by $$I_i = I_m * R_{HDR}^{[(i-m)(n-1)]}$$

wherein $I_i$ is the light intensity level for a recording of an individual low dynamic range input image, $I_m$ is the light intensity level for a recording of a key frame (19c, 19i), i is an index of the individual low dynamic range input image, m is an index of the key frame (19c, 19i), $R_{HDR}$ is a predefined dynamic range coefficient, and n is the number of the low dynamic range input images (19).

2. The microscope (10) according to claim 1, characterized in that the controller (14) is configured to control the recording device (18) while a frame rate during capturing the plurality of low dynamic range input images (19) is kept constant.

3. The microscope (10) according to claim 1, characterized in that the plurality of recording parameters includes an exposure time and a setting of the optical aperture of the optical imaging system (28) and a sensitivity of the image sensor (26) for obtaining the plurality of low dynamic range input images (19).

4. The microscope (10) according to claim 1, characterized in that the controller (14) is configured to control the recording device (18) such that a desired brightness level of a key frame (19c, 19i) of the plurality of low dynamic range input images (19) is obtained.

5. The microscope (10) according to claim 4, characterized in that the controller (14) is configured to obtain the desired brightness level of the key frame (19c, 19i) by performing a comparison of an actual brightness level of the key frame (19c, 19i) with a predefined brightness level input by a user.

6. The microscope (10) according to claim 1, characterized in that the controller (14) is configured to determine a key frame (19c, 19i) from the plurality of low dynamic range input images (19), wherein an index m of the key frame (19c, 19i) is determined based on the number n of the low dynamic range input images (19).

7. The microscope (10) according to claim 6, characterized in that the controller (14) is configured to determine the key frame (19c, 19i) by using $$m = \frac{n+1}{2}$$

if n is an odd number, or $$m = \frac{n}{2}$$

if n is an even number, wherein m is the index of the key frame (19c, 19i), and n is the number of the plurality of the low dynamic range input images (19).

8. The microscope (10) according to claim 1, configured such that the plurality of low dynamic range input images (19) have different brightness levels corresponding to the different light intensity levels.

9. The microscope (10) according to claim 1, further comprising a combiner (20) for combining the plurality of low dynamic range input images (19) recorded at the different light intensity levels to obtain the high dynamic range synthesized image (21).

10. The microscope (10) according to claim 9, characterized in that the combiner (20) is configured to add the intensity information of each of the low dynamic range input images (19a-19f) to obtain the high dynamic range synthesized image (21).

11. The microscope (10) according to claim 9, characterized in that the combiner (20) is configured to add the intensity information of a first pair (19g) of consecutive low dynamic range input images (19i, 19j) to obtain a first high dynamic range synthesized image (21a) and to add the intensity information of a second pair (19h) of consecutive low dynamic range input images (19j, 19h) to obtain a second high dynamic range synthesized image (21b), wherein the first pair (19g) of consecutive low dynamic range input images (19*i*, 19*j*) and the second pair (19*h*) of consecutive low dynamic range input images (19*j*, 19*k*) comprise a common low dynamic range input image (19*j*) of the plurality of low dynamic range input images (19).

12. The microscope (10) according to claim 1, further comprising a tone mapper (22) for applying a tone mapping algorithm to the high dynamic range synthesized image (21) to obtain tone mapped image data (23), the tone mapped image data (23) representing a reduced dynamic range compared to the dynamic range of the high dynamic range synthesized image (21).

13. The microscope (10) according to claim 1, further comprising a live streaming image output module (24) configured to generate a live image (25) on the basis of the high dynamic range synthesized image (21).

14. The microscope (10) according to claim 1, wherein each of the plurality of low dynamic range input images (19) is a digital image.

15. A method for obtaining a high dynamic range synthesized image (21) of an object (12) from a plurality of low dynamic range input images (19), the method comprising illuminating the object (12) at different light intensity levels using an incoherent light source (16) of a microscope (10), recording the plurality of low dynamic range input images (19) using a recording device (18) comprising an optical imaging system (28) having an optical aperture and an image sensor (26) of the microscope (10), wherein each of the low dynamic range input images (19) is recorded at a different light intensity level, and providing control signals to control the recording device (18) and the incoherent light source (16) of the microscope (10) such that the plurality of low dynamic range input images (19) at different light intensity levels is captured while at least one of a plurality of recording parameters is kept constant, wherein the different light intensity levels of the illumination of the object (12) are characterized by a light intensity offset, wherein the light intensity offset is given by $$I_i = I_m * R_{HDR}^{[(i-m)(n-1)]}$$

wherein $I_i$ is the light intensity level for a recording of an individual low dynamic range input image, $I_m$ is the light intensity level for a recording of a key frame (19*c*, 19*i*), i is an index of the individual low dynamic range input image, m is an index of the key frame (19*c*, 19*i*,) $R_{HDR}$ is a predefined dynamic range coefficient, and n is the number of the low dynamic range input images (19).

16. The method according to claim 15, wherein providing the control signals comprises providing control signals to control the recording device (18) while a frame rate during capturing the plurality of low dynamic range input images (19) is kept constant.

17. The method according to claim 15, wherein the plurality of recording parameters includes an exposure time and a setting of the optical aperture of the optical imaging system (28) and a sensitivity of the image sensor (26) for obtaining the plurality of low dynamic range input images (19).

18. The method according to claim 15, further comprising combining the plurality of low dynamic range input images (19) recorded at the different light intensity levels to obtain the high dynamic range synthesized image (21).

19. The method according to claim 15, further comprising applying a tone mapping algorithm to the high dynamic range synthesized image (21) to obtain tone mapped image data (23), the tone mapped image data (23) representing a reduced dynamic range compared to the dynamic range of the high dynamic range synthesized image (21).

20. The method according to claim 15, further comprising generating a live image (25) on the basis of the high dynamic range synthesized image (21).

21. The method according to claim 15, wherein each of the plurality of low dynamic range input images (19) is a digital image.

22. A microscope (10) for obtaining a high dynamic range synthesized image (21) of an object (12) from a plurality of low dynamic range input images (19), the microscope (10) comprising an incoherent light source (16) for illuminating the object (12) at different light intensity levels, a recording device (18) comprising an optical imaging system (28) having an optical aperture and an image sensor (26) for recording the plurality of low dynamic range input images (19), wherein each of the low dynamic range input images (19) is recorded at a different light intensity level, and a controller (14) which is configured to provide control signals to control the recording device (18) and the incoherent light source (16) such that the plurality of low dynamic range input images (19) at different light intensity levels is captured while at least one of a plurality of recording parameters is kept constant, characterized in that the controller (14) is configured to determine a key frame (19*c*, 19*i*) from the plurality of low dynamic range input images (19), wherein an index m of the key frame (19*c*, 19*i*) is determined based on the number n of the low dynamic range input images (19), and characterized in that the controller (14) is configured to determine the key frame (19*c*, 19*i*) by using $$m = \frac{n+1}{2}$$

if n is an odd number, or $$m = \frac{n}{2}$$

if n is an even number, wherein m is the index of the key frame (19*c*, 19*i*), and n is the number of the plurality of the low dynamic range input images (19).

* * * * *